US012725337B2

(12) United States Patent
Liu et al.

(10) Patent No.: US 12,725,337 B2
(45) Date of Patent: Sep. 1, 2026

(54) VIDEO GENERATION METHOD AND DEVICE

(71) Applicant: Beijing Bytedance Network Technology Co., Ltd., Beijing (CN)

(72) Inventors: Wei Liu, Beijing (CN); Qian He, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 262 days.

(21) Appl. No.: 18/568,755

(22) PCT Filed: Sep. 28, 2022

(86) PCT No.: PCT/CN2022/122332
§ 371 (c)(1),
(2) Date: Dec. 8, 2023

(87) PCT Pub. No.: WO2023/061229
PCT Pub. Date: Apr. 20, 2023

(65) Prior Publication Data

US 2024/0276037 A1 Aug. 15, 2024

(30) Foreign Application Priority Data

Oct. 15, 2021 (CN) ......................... 202111204221.7

(51) Int. Cl.
*G06T 13/20* (2011.01)
*G06T 11/00* (2026.01)
*G06V 20/70* (2022.01)

(52) U.S. Cl.
CPC ........... *G06T 13/205* (2013.01); *G06T 11/00* (2013.01); *G06V 20/70* (2022.01)

(58) Field of Classification Search
None
See application file for complete search history.

(56) References Cited

U.S. PATENT DOCUMENTS

2021/0398336 A1 12/2021 Jin et al.

FOREIGN PATENT DOCUMENTS

CN 109218629 A 1/2019
CN 110858924 A 3/2020
CN 111415677 A 7/2020
(Continued)

OTHER PUBLICATIONS

Guo et al. (Dancelt: Music-inspired Dancing Video Synthesis, Computer Vision and Pattern Recognition, 2020) (Year: 2020).*
(Continued)

*Primary Examiner* — Kyle Zhai
(74) *Attorney, Agent, or Firm* — BakerHostetler

(57) ABSTRACT

Embodiments of the present disclosure provide a video generation method, a model determination method, a device, a storage media, a computer program product and a computer program. The video generation method includes: acquiring a target audio; generating an image sequence according to characteristic information of the target audio and an image generation model, wherein the image generation model is used for generating a corresponding image according to a randomly input vector; and combining the target audio and the image sequence to generate a target video corresponding to the target audio.

20 Claims, 4 Drawing Sheets

(56) References Cited

FOREIGN PATENT DOCUMENTS

| | | | |
|---|---|---|---|
| CN | 111933110 | A | 11/2020 |
| CN | 112738634 | A | 4/2021 |
| CN | 112752118 | A | 5/2021 |
| CN | 113935418 | A | 1/2022 |
| JP | 6865705 | B2 | 4/2021 |

OTHER PUBLICATIONS

Zhong et al. (Generative adversarial networks with decoder-encoder output noises, Neural Networks, 2020) (Year: 2020).*

Liem et al. (When music makes a scene Characterizing music in multimedia contexts via user scene descriptions, Int J Multimed Info Retr, 2013) (Year: 2013).*

Qiu et al. (Image generation associated with music data, CVPR 2018 Sight and Sound Workshop) (Year: 2018).*

International Patent Application No. PCT/CN2022/122332; Int'l Search Report; dated Dec. 28, 2022; 3 pages.

* cited by examiner

S201 Acquiring a target audio

S202 Generating an image sequence according to characteristic information of the target audio and an image generation model for generating a corresponding image according to a randomly input vector S203 Combining the target audio and the image sequence to generate a target video corresponding to the target audio Frequency,Amplitude Music Train Starry Sky Scene Video Nature Scene Fireworks Scene Image Generation Model

VIDEO GENERATION METHOD AND DEVICE

CROSS-REFERENCE TO RELATED APPLICATION(S)

The present application is a U.S. National Stage Application of PCT Application Serial No. PCT/CN2022/122332, filed Sep. 28, 2022, which claims priority to the Chinese patent application No. 202111204221.7 entitled "Video Generation Method and Device", filed with China Patent Office on Oct. 15, 2021, which are incorporated herein by reference in their entireties.

FIELD

Embodiments of the present disclosure relate to the field of computer technical, and in particular to a video generation method, a model determination method, a device, a storage medium, a computer program product, and a computer program.

BACKGROUND

With the development of network technology, video integrating rich elements such as image, text and sound, has gradually become the mainstream expression mode in the Internet In addition to video, audio is also an expression manner in the Internet. For example, users may upload songs they have recorded onto social platforms, or share the songs they have recently listened to on the social platforms to express their listening preferences, recent updates, etc.

SUMMARY

Embodiments of the present disclosure provide a video generation method, a model determination method, a device, a storage medium, a computer program product, and a computer program.

In a first aspect, an embodiment of the present disclosure provides a video generation method, including:

acquiring a target audio;

generating an image sequence according to characteristic information of the target audio and an image generation model, wherein the image generation model is used to generate a corresponding image according to a randomly input vector; and combining the target audio and the image sequence to generate a target video corresponding to the target audio.

In a second aspect, an embodiment of the present disclosure provides a model determination method, including:

acquiring training data, wherein the training data includes multiple images;

training an image generation model for multiple times based on the training data, wherein the image generation model is used to generate a corresponding image according to a randomly input vector; and a training process of the image generation model includes:

randomly determining an input vector, and randomly determining label data from the multiple images;

inputting the input vector into the image generation model to obtain an output image; and adjusting the image generation model according to a difference between the output image and the label data.

In a third aspect, an embodiment of the present disclosure provides a video generation device, including:

an acquisition unit for acquiring a target audio;

an image generation unit for generating an image sequence according to characteristic information of the target audio and an image generation model, wherein the image generation model is used for generating a corresponding image according to a randomly input vector; and a video generation unit for combining the target audio and the image sequence to generate a target video corresponding to the target audio.

In a fourth aspect, an embodiment of the present disclosure provides a model determination device, including:

an acquisition unit for acquiring training data, wherein the training data includes multiple images;

a training unit for training an image generation model for multiple times based on the training data, wherein the image generation model is used to generate a corresponding image according to a randomly input vector;

in a training process of the image generation model, the training unit is further used for:

randomly determining an input vector, and randomly determining label data from the multiple images;

inputting the input vector into the image generation model to obtain an output image;

adjusting the image generation model according to a difference between the output image and the label data.

In a fifth aspect, an embodiment of the present disclosure provides an electronic device, including: at least one processor and a memory;

the memory stores computer execution instructions; and the at least one processor executes the computer execution instructions stored in the memory, causing the at least one processor to perform the video generation method as described above in the first aspect or various possible designs of the first aspect, or causing the at least one processor to perform the model determination method as described in the second aspect or various possible designs of the second aspect.

In a sixth aspect, an embodiment of the present disclosure provides a computer-readable storage medium, having computer execution instructions stored therein that, when executed by a processor, implement the video generation method as described above in the first aspect or various possible designs of the first aspect, or implement the model determination method described in the second aspect or various possible designs of the second aspect.

In a seventh aspect, an embodiment of the present disclosure provides a computer program product, containing computer execution instructions that, when executed by a processor, implement the video generation method as described above in the first aspect or various possible designs of the first aspect, or implement the model determination method described in the second aspect or various possible designs of the second aspect.

In an eighth aspect, an embodiment of the present disclosure provides a computer program, containing computer execution instructions that, when executed by a processor, implement the video generation method as described above in the first aspect or various possible designs of the first aspect, or implement the model determination method described in the second aspect or various possible designs of the second aspect.

The video generation method, model determination method, device, storage medium, computer program product and computer program provided by the present embodiment may generate an image sequence based on characteristic information of a target audio and an image generation model, and combine the target audio and the image sequence to generate a target video corresponding to the audio, wherein the image generation model is used for generating a corresponding image according to a randomly input vector.

BRIEF DESCRIPTION OF THE DRAWINGS

In order to describe embodiments of the present disclosure or the related technical solutions more clearly, accompanying drawings required to be used in the description about the embodiments will be simply introduced below. It is apparent that the drawings in the following description are for some embodiments of the present disclosure. Other drawings may further be obtained by those of ordinary skill in the art according to these drawings without using inventive efforts.

DETAILED DESCRIPTION OF EMBODIMENTS

Figures 1, 2:
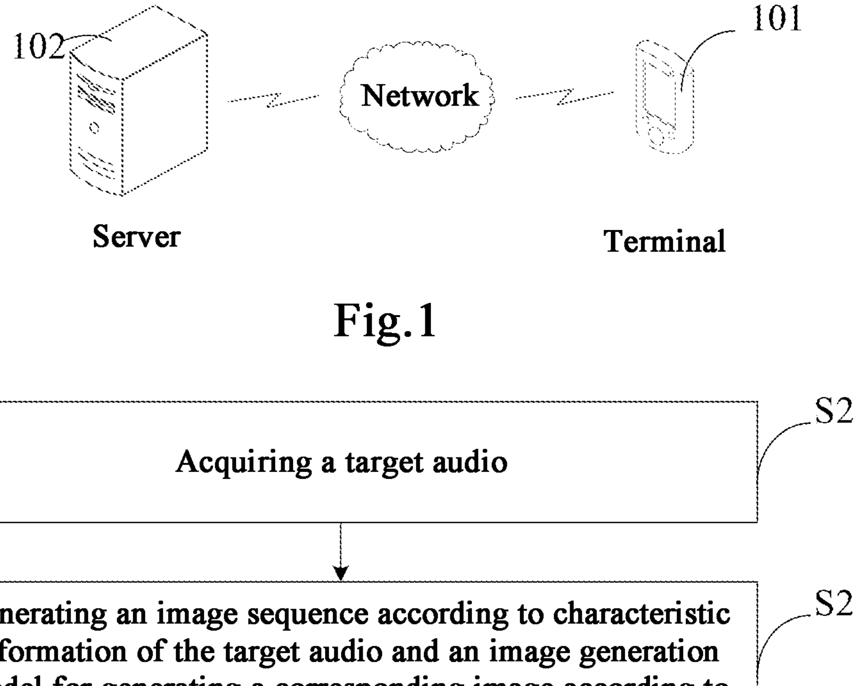
FIG. 1 is a schematic diagram of an application scenario applicable to embodiments of the present disclosure.
FIG. 2 is a first schematic flowchart of a video generation method provided by embodiments of the present disclosure.

In order to make objectives, technical solutions and advantages of the embodiments of the present disclosure more clear, the technical solutions in the embodiments of the present disclosure will be clearly and completely described below with reference to the drawings in the embodiments of the present disclosure. Apparently, the described embodiments are a part of the embodiments of the present disclosure, not all of the embodiments. Based on the embodiments of the present disclosure, all other embodiments obtained by a person of ordinary skill in the art without paying any inventive effort are within the scope of protection of the present disclosure.

In related technologies, to convert audio to video, the user usually manually collects images as video materials, and arranges the playing time of the image based on the playing timeline of the audio. This method has the following shortcomings: 1. the whole process is time-consuming and low-efficiency; 2. the richness of video content is limited to the user's ability to collect and organize video materials, and video quality is greatly affected by subjective factors; 3. it is difficult to produce videos that fit the audio style or type and other characteristics; and 4. when users manually collect video materials on the Internet, they need to pay attention to whether the video materials are authorized and there are copyright risks.

In addition, compared with video, the expression form of audio is single, and users often encounter the problem of no video material suitable for audio when uploading audio onto video websites. Therefore, how to convert audio into video with richer content is currently a problem that needs to be solved.

In order to solve the above problem, embodiments of the present disclosure provide a video generation method, a model determination method, a device, a storage medium, a computer program product and a computer program. An image sequence is generated according to characteristic information of a target audio and an image generation model, which is used for generating a corresponding image according to a randomly input vector, and then the target audio is combined with the image sequence to generate a target video corresponding to the target audio. It can be seen that the embodiments of the present disclosure have the following beneficial effects: 1. the efficiency of converting audio into video is effectively improved, and users only need to input the target audio to obtain the target video corresponding to the target audio; 2. the video content quality is stable, and it has low requirements on users' video production capabilities, which may provide audio-to-video conversion services for a wide range of user groups, improving user experience; 3. the characteristic information of the target audio is referred to in the process of generating the image sequence, which may generate the video fitting the characteristic information of the audio, improving the personalization and uniqueness of the video; and 4. the image sequence as video material is generated by the image generation model based on the randomly input vector, without copyright risks.

Referring to FIG. 1, FIG. 1 is a schematic diagram of an application scenario applicable to embodiments of the present disclosure.

As shown in FIG. 1, in this application scenario, the device involved includes a terminal 101 and a server 102. The user may input audio on the terminal 101. The terminal 101 sends the audio input by the user to the server 102. The server 102 converts the audio into a video and sends the video to the terminal 101. The terminal 101 displays the video to the user. Herein, the terminal 101 and the server 102 communicate through a network.

Taking that the user uploads audio onto a video platform as an example, an app of the video platform is installed on the terminal 101, and the server 102 is a back-end server (or a product server) corresponding to the video platform. The user inputs an audio to be uploaded on the app on the terminal 101, the terminal 101 sends the audio to the server 102, and the server 102 converts the audio into video and returns the video to the terminal 101. The terminal 101 displays the video to the user. After confirming that the video meets their own needs, the user determines to upload the video.

Herein, when the computing capability of the terminal 101 is strong, the terminal 101 may convert the audio into video.

Herein, the terminal may be a personal digital assistant (PDA for short) device, a handheld device (such as a smartphone, a tablet), a computing device (such as a personal computer (PC for short)), a vehicle-mounted device, or a wearable device (such as a smart watch, a smart bracelet), and a smart home device (such as a smart display device), etc. The server may be a distributed server, a centralized server, and a cloud server, etc.

Various embodiments of the present disclosure are provided below. Herein, an execution subject of various embodiments of the present disclosure may be an electronic device, which may be a terminal or a server.

Referring to FIG. 2, FIG. 2 is a first schematic flowchart of a video generation method provided by embodiments of the present disclosure. As shown in FIG. 2, the video generation method includes following steps.

At S201, the target audio is acquired.

The number of target audios may be one or more, and the types of target audios may be, for example, songs, voices, etc., which are not limited to the types and formats of the target audio here.

In one example, a target audio input by the user is acquired. For example, the music recorded or uploaded by users on apps such as music players and video platforms is acquired.

In yet another example, one or more target audios in an audio database are acquired. For example, the target audio may be acquired randomly from the audio database, or may be acquired in a storage order, or may be acquired in an order specified by the user, or may be acquired by the user's indication, wherein the audio database may be a local database or a cloud database.

In yet another example, a target audio from another device is acquired. For example, when the current execution subject is a server, a target audio from the terminal may be acquired.

In the present embodiment, a target audio may be obtained from a video production request in response to the video production request for the target audio, or the target audio may be obtained in a manner of any of the above examples. The video production request for the target audio may be triggered by a preset user operation. For example, in an app corresponding to the video platform, after uploading the target audio, the user clicks the "Produce Video" button to trigger the video production request for the target audio.

At S202, an image sequence is generated according to characteristic information of the target audio and an image generation model, which is used for generating a corresponding image based on a randomly input vector.

Herein, the characteristic information of the target audio may reflect characteristic(s) of one or more aspects of the target audio.

Herein, the image generation model may be a deep learning model in which the input data is a vector and the output data is an image, so as to improve the quality of image generation through the deep learning model.

In the present embodiment, the characteristic information of the target audio is extracted from the target audio. An input vector is generated randomly, and based on a combination of the characteristic information of the target audio and the input vector generated randomly, the image generation model is used for generating multiple images to obtain an image sequence. In the generation process of the image, the characteristic information of the target audio is used for causing the image generated by the image generation model to conform to characteristic(s) of one or more aspects of the audio, improving the fitting degree of the image with the characteristics of one or more aspects of the audio; and the input vector generated randomly is used for causing the image in the image sequence to have randomness, thereby generating a unique, personalized image sequence suitable for the target audio and avoiding copyright risks.

At S203, the target audio and the image sequence are combined to generate a target video corresponding to the target audio.

In the present embodiment, the playing time of each frame of image in the target video may be arranged based on a playing timeline of the target audio, and a combination of the target audio and the image sequence is achieved on the playing timeline of the target audio to obtain a target video in which the target audio is a video audio and the image sequence is video pictures, so that a video that is unique, personalized and suitable for the target audio is generated for the audio.

In the embodiments of the present disclosure, an image sequence is generated based on the characteristic information of the target audio and an image generation model for generating a corresponding image according to a randomly input vector, and a target video is generated by combining the target audio and the image sequence. Thereby, the efficiency of converting audio to video is improved, the requirements for users' video production capabilities is reduced, an audio-to-video conversion service is provided to more users, and the converted video has the characteristics of uniqueness, personalization and high fitting degree with audio, avoiding copyright risks.

Considering that audios of different scene types are suitable for images of different scene types and are limited to the training data, a single image generation model is more effective when used for generating images of a specific scene type, and is more capable of generating images with better quality and of a more accurate scenes type. In view of this, the present disclosure further provides an embodiment to improve a fitting degree of the converted video with the audio in terms of scene type, that is, to achieve a conversion of the audio into a video of the same or similar scene type.

Figures 3, 4:
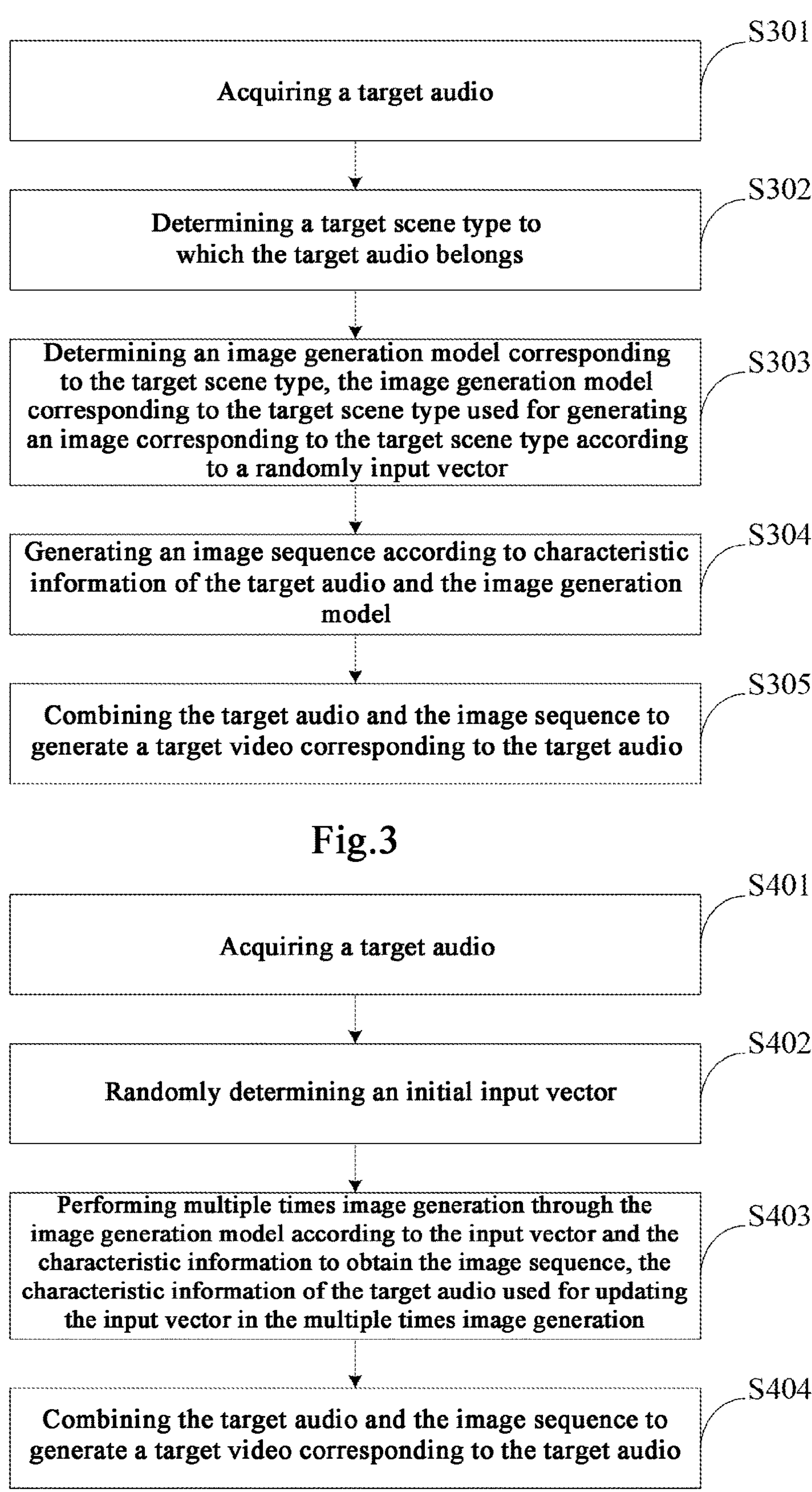
FIG. 3 is a second schematic flowchart of a video generation method provided by embodiments of the present disclosure.
FIG. 4 is a third schematic flowchart of a video generation method provided by embodiments of the present disclosure.

Referring to FIG. 3, FIG. 3 is a second schematic flowchart of a video generation method provided by embodiments of the present disclosure. As shown in FIG. 3, the video generation method includes following steps.

At S301, a target audio is acquired.

The implementation principles and technical effects of S301 may be referred to the foregoing embodiments and will not be described again.

At S302, a target scene type to which the target audio belongs is determined.

The scene type to which the audio belongs may reflect characteristics of the audio from the perspective of the scene, making the audio have a sense of picture. For example, scene types include starry sky scenes, nature scenes, fireworks scenes, etc. It can be seen that in the process of converting audio to video, using the scene type to which the audio belongs is beneficial to converting the video to a video that has a higher fitting degree between the video picture and the audio.

In one example, the target scene type input by the user is acquired.

For example, while inputting the target audio, the user inputs the target scene type to which the target audio belongs; for another example, after obtaining the target audio, the user is reminded to input the target scene type to which the target audio belongs, and then the target scene type input by the user is acquired.

In another example, the target scene type to which the target audio belongs may be determined through a natural language processing method and audio information of the target audio.

The audio information of the target audio includes one or more of the following: a name of the target audio, an introduction of the target audio, and content of the target audio.

Specifically, a preset scene dictionary may be used to perform a natural language processing on the audio information of the target audio, such as word segmentation, matching, etc., to extract words related to the scene type, and the target scene type to which the target audio belongs is obtained based on these words. Therefore, the natural language processing method is used to improve an accuracy of determining the target scene type to which the target audio belongs.

Taking a song as an example, the audio information of the song includes a name, an introduction and lyrics of the song. The natural language processing method is used to extract scene-related words such as "starry sky" and "moon" from the name, the introduction and the lyrics of the song, and these words may form the scene information of the song.

In yet another example, the target scene type is determined as a scene type that matches identification information of the target audio from multiple scene types.

Multiple scene types (such as a starry sky scene, a nature scene, and a fireworks scene) are preset. The identification information of the target audio includes a name, a label word and/or an identification image of the target audio. For example, for some songs related to the starry sky scenes, on a music playing platform, users may add label words similar to "starry sky", "moon", and "star" to these songs; and the identification image is a cover image of the target audio.

Specifically, multiple scene types are matched with the identification information of the target audio, a matching degree of the multiple scene types with the identification information of the target audio is obtained, and the target scene type is determined as a scene type having the highest matching degree with the identification information of the target audio from the multiple scene types. Matching the multiple scene types with the identification information of the target audio includes at least one of the following: matching names of multiple scene types with the name and/or identification word of the target audio, matching scene images of the multiple scene types with identification image of the target audio. Thereby, the accuracy of determining the target scene type to which the target audio belongs is improved through an image-text matching method.

At S303, an image generation model corresponding to the target scene type is determined, wherein the image generation model corresponding to the target scene type is used for generating an image corresponding to the target scene type according to a randomly input vector.

Image scene models corresponding to the multiple scene types may be pre-trained to obtain a correspondence relationship between the multiple scene types and the image generation model. In this correspondence relationship, the image generation model corresponding to the scene type is used to generate images corresponding to this scene type.

For example, an image generation model corresponding to the starry sky scene is used to generate images corresponding to the starry sky scene; an image generation model corresponding to the nature scene is used to generate images corresponding to the nature scene; and an image generation model corresponding to the fireworks scene is used to generate images corresponding to the fireworks scene.

In the present embodiment, an image generation model corresponding to the target scene type may be determined based on a correspondence relationship between the scene type and the image generation model. Specifically, in this correspondence relationship, a target scene type is searched, and then the image generation model corresponding to the target scene type is determined, thereby improving the fitting degree between the audio and the image generated by the image generation model in the scene type, and further improving the fitting degree between the audio and the video generated subsequently in the scene type, and improving the effect of video generation.

Optionally, model structures of image generation models corresponding to different scene types are the same.

Optionally, model structures of image generation models corresponding to different scene types are different, thereby becoming possible to adapt to the actual conditions of different scenes, design corresponding image generation models, and improve a model performance of the image generation model. For example, an image generation model in a face scene includes a network structure of face recognition, while an image generation model in other scenes does not need to design this network structure.

At S304, an image sequence is generated according to the characteristic information of the target audio and the image generation model.

At S305, the target audio and the image sequence are combined to generate a target video corresponding to the target audio.

The implementation principles and technical effects of S304~S305 may be referred to the foregoing embodiments, and will not be described again.

In the embodiments of the present disclosure, an image sequence is generated based on the characteristic information of the target audio and the image generation model corresponding to the target scene type to which the target audio belongs, and the target video is generated by combining the target audio and the image sequence. Thereby, in addition to the beneficial effects of the foregoing embodiments, a fitting degree between the target video and the target audio is further improved, so that the video pictures of the target video may more accurately reflect the scene to which the audio belongs.

Based on any of the foregoing embodiments, the present disclosure further provides an embodiment.

Referring to FIG. 4, FIG. 4 is a third schematic flowchart of a video generation method provided by embodiments of the present disclosure. As shown in FIG. 4, the video generation method includes following steps.

At S401, a target audio is acquired.

The implementation principles and technical effects of S401 may be referred to the foregoing embodiments and will not be described again.

At S402, an initial input vector is determined randomly.

In the present embodiment, the initial input vector may be determined randomly according to a preset data distribution. For example, the initial input vector is determined randomly according to a normal distribution. The input vector is, for example, a one-dimensional vector with a vector size of 1*512.

At S403, according to the input vector and the characteristic information, multiple times image generation is performed through the image generation model to obtain an image sequence, and the characteristic information of the target audio in the multiple times image generation is used for updating the input vector.

In the present embodiment, in the first image generation, an initial input vector is input into the image generation model to obtain a first image output by the image generation model. Then, in the second image generation, the input vector is updated according to the characteristic information of the target audio, wherein the updated input vector is the input vector in the second image generation, and the input vector is input into the image generation model to obtain a second image output by the image model. In the third image generation, the input vector is updated again according to the characteristic information of the target audio. This cycle is repeated to obtain multiple images. Therefore, by using the characteristic information of the target audio to update the input vector in each image generation process, the image generated based on the randomly input vector can reflect the characteristic information of the audio.

In an example, when updating the input vector according to the characteristic information of the target audio, a target change value may be determined based on the characteristic information of the target characteristic, and the input vector may be increased or decreased according to the target change value. For example, the target vector is a certain characteristic value of the target audio, and the characteristic value is added to the input vector, or is subtracted from the input vector.

In yet another example, considering that the changes in audio and video are both coherent or continuous, in order to ensure the coherence or continuity of image changes in each frame of the target video and improve the pace consistency between audio changes and video changes, the update directions of the input vectors in the multiple times image generation are consistent. At this time, as shown in FIG. 4, a possible implementation of S403 includes: determining a direction vector; perform multiple times image generation through the image generation model according to the input vector, the characteristic information of the audio and the direction vector, to obtain the image sequence, wherein the direction vector is related to an update direction of the input vector in each image generation.

Optionally, when determining the direction vector, the direction vector is randomly determined, so that the changing directions of the video pictures in the same video are consistent, and the changing directions of the video pictures in different videos are random, further increasing the randomness of the video obtained by audio conversion.

Optionally, when determining the direction vector, the direction vector input by the user is acquired.

Optionally, when determining the direction vector, the preset direction vector is acquired.

Specifically, first the direction vector is determined. When updating the input vector, a change amount of the input vector is determined according to the characteristic information of the audio, and the input vector is updated in conjunction with the change amount and the direction vector. Thereby, the update directions of the input vectors in the multiple times image generation can be consistent, such that the input vectors in the multiple times image generation change continuously, and further the images output by the image generation model also change continuously with the continuous changes of the input vectors, improving the continuity of the target video changing.

Optionally, the change amount of the input vector is proportional to the characteristic information of the audio, thereby improving the similarity in amplitude between the change of the input vector and the change of the characteristic information of the audio.

In an example, the characteristic information of the target audio changes over time. At this time, an image generation process in the multiple times image generation described above includes: determining the characteristic information of the target audio in target units of time, wherein the target units of time is units of time corresponding to the current times of image generation; updating the input vector according to the characteristic information of the target audio in the units of time and the direction vector. Therefore, based on the characteristic information of the target audio that changes over time, the pace consistency between the changes in the characteristic information of the audio and the changes in the input vector is improved, thereby improving the pace consistency between the changes in the audio and the changes in the video.

The pace consistency between the changes in the characteristic information of the audio and the changes in input vector includes one or more of the following aspects: a time consistency between the changes in the characteristic information of the audio and the changes in the input vector, and an amplitude consistency between the changes in the characteristic information of the audio and the changes in the input vector. For example, a certain characteristic value of the audio decreases at time a, and then the input vector also decreases at time a, and/or a certain characteristic value of the audio changes with a large amplitude, and then the input vector also changes with a large amplitude.

Similarly, the pace consistency between the changes in audio and the changes in video includes one or more of the following aspects: a time consistency between the changes in audio and the changes in video, an amplitude consistency between the changes in the audio and the changes in the video. For example, when the melody of the audio changes, the picture of the video also changes, and the melody of the audio changes greatly, and then the picture of the video also changes greatly.

Specifically, a correspondence relationship between multiple units of time on the playing timeline of the target audio and the times of image generation may be determined first. On the playing timeline, the first unit of time corresponds to the first image generation, and the second unit of time corresponds to the second image generation and so on. At this time, a generation process of the image sequence includes: in the first image generation, inputting an initial input vector determined randomly into the image generation model to obtain the first image; in the second unit of time, updating the input vector according to the characteristic information of the target audio and the direction vector, and inputting the updated input vector into the image generation model to obtain the second image; and in the third image generation, updating the input vector according to the characteristic information of the target audio in the third unit of time and the direction vector, and inputting the updated input vector into the image generation model to obtain the third image, . . . , and so on. The total times of image generation is equal to the total number of the units of time, and when the times of image generation is greater than the total number of the units of time, the image generation process is ended, obtaining an image sequence consisting of the first image, the second image, etc.

Optionally, the characteristic information of the target audio includes frequencies of the target audio in multiple units of time. At this time, a single image generation process includes: one image generation process of the multiple times image generation described above, including: determining a frequency of the target audio in a target unit of time; and updating the input vector according to the frequency of the target audio in the target unit of time and the direction vector. The frequencies of the target audio in multiple units of time reflect a melody of the target audio, so that the pictures of the video continuously change as the melody of the target audio changes, thereby improving the fitting degree between the audio and the video obtained by the audio conversion, and improving the quality of the video.

Further, updating the input vector according to the frequency of the target audio in a unit of time and direction vector includes: updating the input vector according to a first proportion coefficient and a frequency of the target audio in the target unit of time and the direction vector. The first proportional coefficient and the frequency of the target audio in the target unit of time are used to determine a change amount before and after the input vector is updated, so that the input vector changes with the frequency of the target audio by means of the proportional coefficient.

Further, according to the first proportional coefficient, the frequency of the target audio in the target unit of time and the direction vector, the formula for updating the input vector may be expressed as: updated input vector=first proportional coefficient*frequency*direction vector+input vector for the last image generation.

Optionally, the characteristic information of the target audio includes the amplitudes of the target audio in multiple units of time, thereby improving the fitting degree between the video converted from the audio and the audio from the perspective of amplitude, so that the changes in the video pictures reflect the amplitude changes of the audio. For example, in a case the amplitudes of the audio change greatly, the pictures of the video change greatly, and in a case the amplitudes of the audio change slightly, the pictures of the video change slightly. Taking music as an example, the amplitudes of the music reflect the changes in the drumbeats of the music; and when the drumbeats of the music suddenly change, the pictures of the video change greatly, and when the drumbeats of the music are relatively gentle, the pictures of the video change slightly.

In each image generation, the process of updating an input vector based on the amplitude of the target audio in the target unit of time and the direction vector may be referred to the process of updating an input vector based on the frequency of the target audio in the target unit of time and the direction vector in the previous embodiments, and will not be described again.

Optionally, the characteristic information of the target audio includes frequencies of the target audio in multiple units of time and amplitudes of the target audio in multiple units of time. At this time, after updating the input vector based on the frequency of the target audio in the target units of time and the direction vector, in a case where an amplitude difference between the amplitude of the target audio in the target unit of time and the amplitude of the previous unit of time is greater than a difference threshold, a disturbance amount is determined according to the amplitude difference and the direction vector; and the updated input vector is updated again according to the disturbance amount. Therefore, in a case where the amplitude changes of the target audio are small, the input vector is updated based on the frequencies of the target audio, and in a case the amplitude changes of the target audio are large (including the situations of large decreases in amplitudes or large increases in amplitudes), the input vector is updated based on the frequencies and the amplitudes of the target audio, further improving the fitting degree between the video converted from the audio and the audio, so that the video pictures may reflect the frequency changes and amplitude changes of the audio, improving the video quality.

Herein, the difference threshold is a preset threshold.

Herein, a magnitude of the disturbance amount is depending on the amplitude difference, and a direction of the disturbance amount is depending on the direction vector.

Further, determining the disturbance amount according to the amplitude difference and the direction vector includes: updating the input vector again according to a second proportional coefficient, the amplitude difference and the direction vector. The second proportional coefficient and the amplitude difference are used to determine the magnitude of the disturbance amount, so that the input vector changes as the amplitude of the target audio changes by combining the proportional coefficient and the amplitude.

Further, the total updating formula of the input vector is expressed as L: updated input vector=second proportional coefficient*amplitude difference*direction vector+first proportional coefficient*frequency*direction vector+input vector for the last image generation.

As an example, taking music as an example, the input vectors are continuously updated based on the frequency of the music input by the user, and the corresponding image sequences is continuously generated through the image generation model to form a video. For the position of the pulse drumbeat in the music that changes suddenly (the amplitude changes greatly), the input vector may be given a disturbance proportional to the amplitude change (that is, the disturbance amount described above), and after the drumbeat passes (the amplitude also changes greatly), the disturbance is removed, in which the control vector may be restored to the same state as before the arrival of the pulse.

At S404, the target audio and the image sequence are combined to generate the target video corresponding to the target audio.

The implementation principles and technical effects of S404 may be referred to the foregoing embodiments and will not be described again.

In an embodiment of the present disclosure, an initial input vector is randomly determined, and an image sequence is generated through an image generation model based on the input vector and the characteristic information of the target audio. The characteristic information of the target audio is used for updating the input vector in each image generation. Thereby, based on the beneficial effects of any of the foregoing embodiments, the pictures of the video converted from the audio change with the characteristics of the audio, so that the pictures of the video converted from the audio may more vividly reflect the characteristics of the audio.

Based on any of the foregoing embodiments, optionally, the image generation model is a generative adversarial model. Generating an image sequence according to the characteristic information of the target audio and the image generation model includes: generating an image sequence according to the characteristic information of the target audio and a generator in the image generation model. The generative adversarial model may be used to generate vivid images, so using the generative adversarial model as an image generation model will help improve the quality of image generation, thereby improving the quality of the video converted from audio.

Specifically, in the training process, the image generation model may be trained to improve the image quality generated by the generator in the image generation model. In the application process, an image sequence may be generated through the generator in the trained image generation model based on the characteristic information of the target audio. The generation process of the image sequence may be referred to the foregoing embodiments, and will not repeated again.

Below, the training of the image generation model in any of the foregoing embodiments is described through embodiments.

It should be noted that the application process of the image generation model (that is, the foregoing multiple embodiments) and the training process of the image generation model may be both performed on the same electronic device, or may be performed on different electronic devices. For example, the application process of the image generation model is performed on the terminal, and the training process of the image generation model is performed on the server; and the application process and the training process of the image generation model are performed on the same or different servers, or on the same or different terminals, which will not be given examples one by one here.

Figures 5, 6:
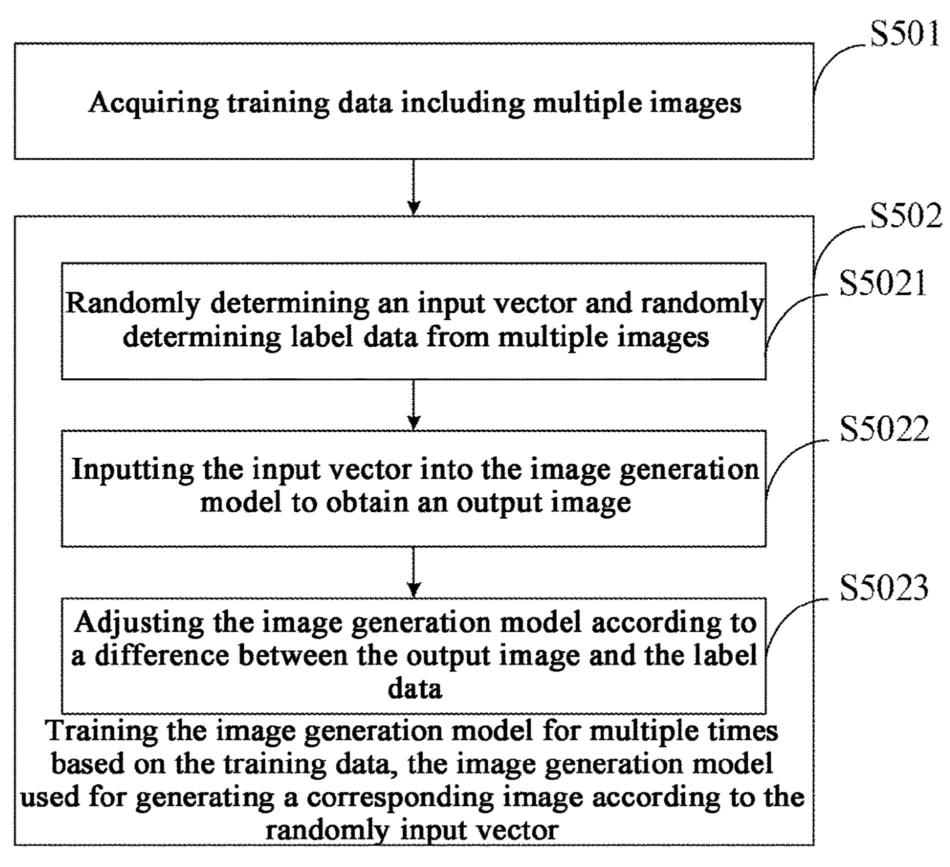
FIG. 5 is a first schematic flowchart of a model determination method provided by embodiments of the present disclosure.
FIG. 6 is a schematic diagram of a process of converting music into video provided by embodiments of the present disclosure.

Referring to FIG. 5, FIG. 5 is a first schematic flowchart of a model determination method provided by embodiments of the present disclosure. As shown in FIG. 5, the model determination methods include following steps.

At S501, training data is acquired, and the training data includes multiple images.

In the present embodiment, multiple images used as training data in the training process of the image generation model may be obtained from a training database, wherein the training database includes one or more pre-collected images.

In an example, image generation models corresponding to different scene types may be trained, and an image generation model corresponding to a scene type is used to generate images under this scene type (which may refer to the foregoing embodiments, such as the embodiment shown in FIG. 2). At this time, S501 includes: acquiring multiple scene images under multiple scene types, and determining training data corresponding to the scene type for each scene type, wherein the training data includes multiple scene images under this scene type. The multiple scene images under multiple scene types may be obtained from the database.

For example, referring to FIG. 6, FIG. 6 is a schematic diagram of a process of converting music into a video provided by embodiments of the present disclosure. As shown in FIG. 6, multiple images under a starry sky scene, multiple images under a nature scene, and multiple images under a fireworks scene are acquired, and the multiple images under the starry sky scene, the multiple images under the nature scene, and the multiple images under the fireworks scene are used to train an image generation model corresponding to the starry sky scene, an image generation model corresponding to the nature scene, and an image generation model corresponding to the fireworks scene.

At S502, the image generation model is trained for multiple times based on the training data, and the image generation model is used to generate corresponding images according to the randomly input vector.

Herein, as shown in FIG. 5, a training process of the image generation model includes following steps.

At S5021, an input vector is determined randomly and label data is determined randomly from multiple images.

At S5022, the input vector is input into the image generation model to obtain an output image.

At S5023, the image generation model is adjusted according to a difference between the output image and the label data.

In the present embodiment, in each training process, the input vector is determined randomly, an image is selected from multiple images in the training data as label data, the input vector is input into the image generation model to obtain an output image of the image generation model, a loss value is determined according to a loss function of the image generation model, the output image and the label data, and parameters of the image generation model are adjusted based on the loss value. In this way, the training process is performed for multiple times until the number of training is greater than the number of threshold, or until the loss value of the loss function is less than or equal to a loss threshold. The loss function is not limited here.

In an example, when training image generation models corresponding to different scene types, an image generation model corresponding to the scene type may be trained for each scene type based on training data corresponding to the scene type, so that a single image generation model is used for generating images corresponding to a scene type. For each scene type, in each training process, scene images under the scene type are selected as label data from the training data corresponding to the scene type.

In an example, an input vector may be determined randomly based on a preset data distribution. For example, an input vector is determined randomly based on a normal distribution.

In an example, sampling without replacement manner may be used to select label data from multiple images. Thereby, it can avoid the same image from being extracted as label data in the case where the input vectors are different, which affects an accuracy of different images generated by the image generation model according to different input vectors.

In an example, the image generation model is a generative adversarial model. At this time, in each training process, an input vector determined randomly is input to a generator in the image generation model to obtain an output image of the generator, the output image and the label data of the generator are distinguished by using a discriminator in the image generation model. In this way, a loss value corresponding to the generator and a loss value corresponding to the discriminator are obtained, and according to these loss values, the generator and discriminator are adjusted respectively. As such, in the training process, the output image of the image generation model is continuously approximated to the label data, and finally, the trained image generation model is obtained.

It should be noted that the trained image generation model in this embodiment may be applied to the video generation method provided in any of the foregoing embodiments to achieve the conversion of an audio into a video.

For example, as shown in FIG. 6, in the application process, a video may be generated based on trained image generation models corresponding to various scene types, and a frequency and an amplitude of music.

Figure 7:
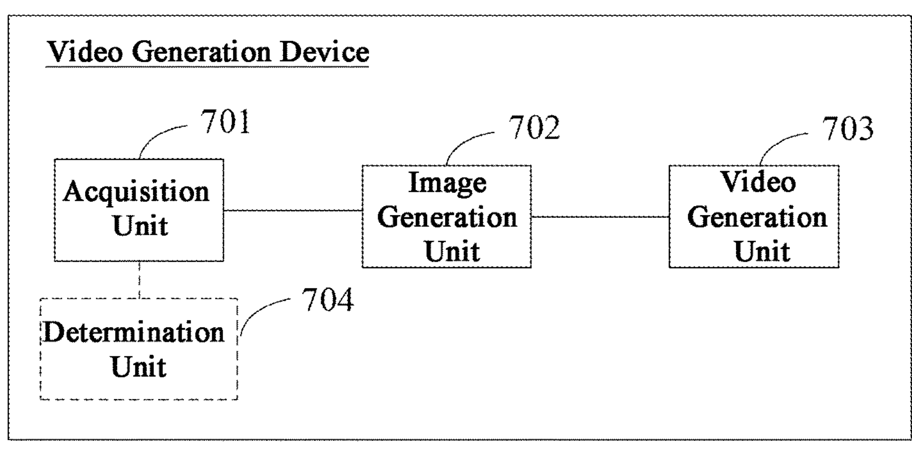
FIG. 7 is a structure diagram of a video generation device provided by embodiments of the present disclosure.

Corresponding to the video generation method in the above embodiment, FIG. 7 is a structure diagram of a video generation device provided by embodiments of the present disclosure, and only parts related to the embodiments of the present disclosure are shown for convenience of explanation. Referring to FIG. 7, the video generation device includes: an acquisition unit 701, an image generation unit 702, and a video generation unit 703.

The acquisition unit 701 is used for acquiring a target audio.

The image generation unit 702 is used to generate an image sequence according to characteristic information of the target audio and an image generation model, and the image generation model is used for generating a corresponding image according to a randomly input vector.

The video generation unit 703 is used for combining the target audio and the image sequence to generate a target video corresponding to the target audio.

In some embodiments, the video generation device further includes a determination unit 704, which is used for: determining a target scene type to which the target audio belongs; and determining an image generation model corresponding to the target scene type, wherein the image generation model corresponding to the target scene type is used for generating the image corresponding to the target scene type according to the randomly input vector.

In some embodiments, the determination unit 704 is further used for determining the target scene type as a scene type that matches the identification information of the target audio from multiple scene types.

In some embodiments, the determination unit 704 is further used for determining an image generation model corresponding to the target scene type based on a correspondence relationship between the scene type and the image generation model.

In some embodiments, the image generation unit 702 is further used for randomly determining an initial input vector; and performing multiple times image generation through the image generation model according to the input vector and characteristic information to obtain the image sequence. In the multiple times image generation, the characteristic information of the target audio is used for updating the input vector.

In some embodiments, update directions of the input vectors in the multiple times image generation are consistent, and the image generation unit 702 is further used for determining an direction vector; and performing multiple times image generation through the image generation model, according to the input vector, the characteristic information and the direction vector, to obtain an image sequence, wherein the direction vector is related to the update direction of the input vector in each image generation.

In some embodiments, the characteristic information further includes frequencies of the target audio in multiple units of time, and in one image generation process of the multiple times image generation processes, the image generation unit 702 is further used for: determining a frequency of the target audio in the target unit of time, wherein the target unit of time is a unit of time corresponding to the current times of image generation; updating the input vector according to the frequency of the target audio in the target unit of time and direction vector; and inputting the updated input vector into the image generation model to obtain a current frame image.

In some embodiments, the characteristic information also includes amplitudes of the target audio in multiple units of time, and the image generation unit 702 is further used for: in a case where an amplitude difference between the amplitude in the target units of time and the amplitude of the last unit of time of the target audio is greater than a difference threshold, determining a disturbance amount according to the amplitude difference and direction vector; and updating the updated input vector again according to the disturbance amount.

In some embodiments, the image generation model is a generative adversarial model, and the image generation unit 702 is further used for: generating the image sequence according to the characteristic information of the target audio and the generator in the image generation model.

The video generation device provided by the present embodiment can be used to perform the technical solution of the above embodiments related to the video generation method, wherein the implementation principles and technical effects thereof are similar, and here the embodiment will not be described again.

Figure 8:
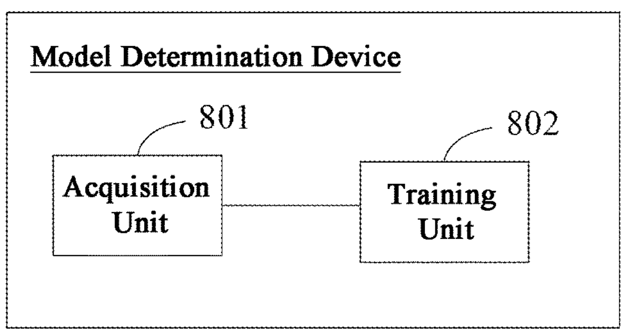
FIG. 8 is a structure diagram of a model determination device provided by embodiments of the present disclosure.

Corresponding to the video generation method in the above embodiment, FIG. 8 is a structure diagram of a model determination device provided by embodiments of the present disclosure, and for convenience of explanation, only parts related to the embodiments of the present disclosure are shown. Referring to FIG. 8, the model determination device includes: an acquisition unit 801 and a training unit 802.

The acquisition unit 801 is used for acquiring training data, which includes multiple images.

The training unit 802 is used for training the image generation model for multiple times based on the training data, and the image generation model is used for generating a corresponding image according to a randomly input vector.

In a training process of the image generation model, the training unit 802 is further used for: randomly determining an input vector and randomly determining label data from multiple images; inputting the input vector into the image generation model to obtain an output image; and adjusting the image generation model according to a difference between the output image and the label data.

In some embodiments, the acquisition unit 801 is further used for: acquiring multiple scene images under multiple scene types; and determining, for each scene type, training data corresponding to the scene type, wherein the training data includes multiple scene images under the scene type.

In some embodiments, the training unit 802 is further used for: for each scene type, based on training data corresponding to the scene type, training an image generation model corresponding to the scene type.

In some embodiments, the training unit 802 is further used for: randomly determining an input vector based on a preset data distribution; and selecting label data from multiple images by means of sampling without replacement.

In some embodiments, the image generation model is a generative adversarial network model.

The model determination device provided by the present embodiment may be used for performing the technical solutions of the above embodiments related to the model determination method, and the implementation principles and technical effects thereof are similar, and here the embodiment will not be described again.

Figure 9:
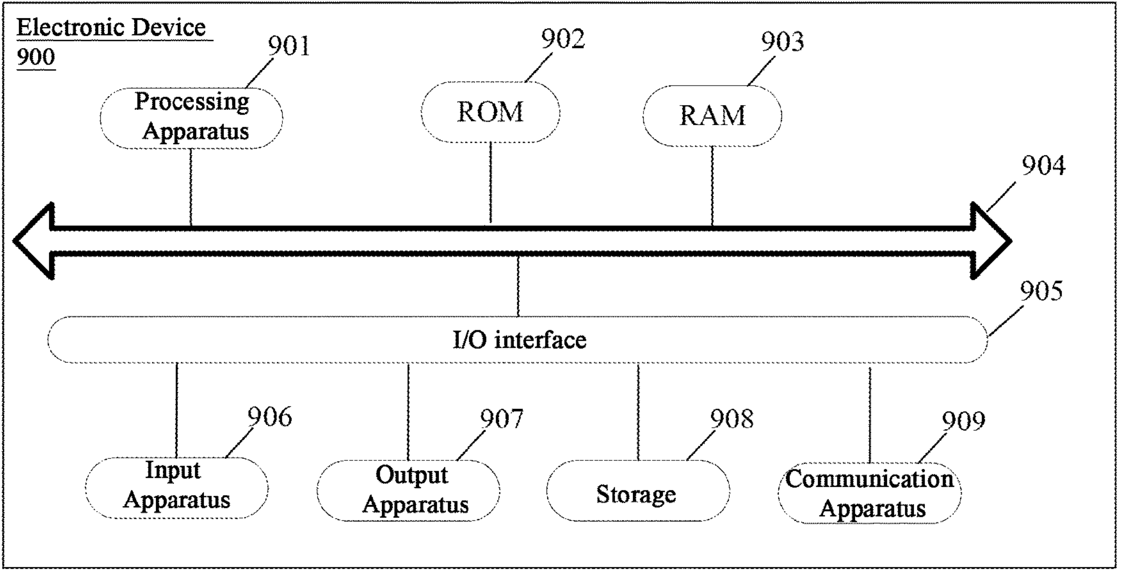
FIG. 9 is a schematic diagram of a hardware structure of an electronic device provided by embodiments of the present disclosure.

Referring to FIG. 9, it shows a schematic diagram of a structural of an electronic device 900 suitable for implementing embodiments of the present disclosure. The electronic device 900 may be a terminal device or a server, wherein the terminal device may include, but are not limited to, mobile terminals such as mobile phones, laptops, digital broadcast receivers, personal digital assistants (PDA), Portable Android Device (PAD for short), Portable Media Player (PMP for short), vehicle-mounted terminals (for example vehicle-mounted navigation terminals), etc., and fixed terminals such as digital TV, desktop computers, etc. The electronic device shown in FIG. 9 is only an example, and should not bring any limitation to the functions and use scope of the embodiment of the present disclosure.

As shown in FIG. 9, the electronic device 900 may include a processing apparatus (such as a central processing unit, a graphics processor, etc.) 901, which may perform various appropriate actions and processing according to programs stored in a Read Only Memory (ROM for short) 902 or from programs loaded from a storage 908 to a Random Access Memory (RAM for short) 903. In the RAM 903, various programs and data required for the operation of the electronic device 900 are also stored. The processing apparatus 901, the ROM 902 and the RAM 903 are connected to each other via a bus 904. An input/output (I/O) interface 905 is also connected to bus 904.

Generally, the following apparatus may be connected to the I/O interface 905: input apparatus 906 including, for example, a touch screen, a touch pad, a keyboard, a mouse, a camera, a microphone, an accelerometer, a gyroscope, etc.; an output apparatus 907 including, for example, a Liquid Crystal Display (LCD), a speaker, a vibrator, etc.; a storage 908 including, for example, a magnetic tape, a hard disk, etc.; and a communication apparatus 909 which may allow the electronic device 900 to communicate wirelessly or wiredly with other devices to exchange data. Although FIG. 9 illustrates an electronic device 900 having various apparatus, it should be understood that implementation or availability of all illustrated apparatus is not required. More or fewer apparatus may alternatively be implemented or provided.

In particular, according to embodiments of the present disclosure, the processes described above with reference to the flowcharts may be implemented as computer software programs. For example, embodiments of the present disclosure include a computer program product including a computer program carried on a computer-readable medium, which contains program codes for performing the method illustrated in the flowchart. In such embodiments, the computer programs may be downloaded and installed from the network via communication apparatus 909, or installed from storage 908, or installed from ROM 902. When the computer programs are executed by the processing apparatus 901, the above-mentioned functions defined in the method of the embodiment of the present disclosure are performed.

It should be noted that the storage medium of the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus or device, or a combination of any of the above. More specific examples of the computer-readable storage medium may include, but is not limited to, an electrical connector with one or more wires, a portable computer disk, a hard disk, a Random Access Memory (RAM), a Read-Only Memory (ROM), an Erasable Programmable ROM (EPROM) (or a flash memory), an optical fiber, a portable Compact Disc Read-Only Memory (CD-ROM), an optical storage device, a magnetic storage device, or any proper combination thereof. In the present disclosure, the computer-readable storage medium may be any physical medium including or storing a program which may be used by or in combination with an instruction execution system, apparatus or device. In the present disclosure, the computer-readable signal medium may include a data signal in a baseband or propagated as a part of a carrier, with computer-readable program codes carried therein. Multiple forms may be used for this propagated data signal, including, but not limited to, an electromagnetic signal, an optical signal, or any proper combination. The computer readable signal medium may also be any computer readable medium other than a computer readable storage medium, which may transmit, propagate or send a program for use by or in connection with an instruction execution system, apparatus or device. The program codes included on the computer readable medium may be transmitted by any suitable medium, including but not limited to wireless, electric wire, optical cable, or RF (Radio Frequency), or any suitable combination of the above.

The above-mentioned computer-readable medium may be included in the electronic device, or exist independently but is not assembled in the electronic device.

The computer-readable medium carries one or more programs that, when executed by the electronic device, causing the electronic device performs the method shown in the above embodiment.

The computer program codes used for executing operations in the present disclosure may be edited by one or more program design languages or combinations thereof. The program design language includes an object-oriented program design language such as Java, Smalltalk and C++, and also includes a conventional procedural program design language such as "C" language or a similar program design language. The program codes may be completely executed in a user computer, partially executed in the user computer, executed as an independent software package, executed partially in the user computer and partially in a remote computer, or executed completely in the remote computer or a server. In a case involving a remote computer, the remote computer may be connected to the user computer through any type of network including, including a Local Area Network (LAN for short) or a Wide Area Network (WAN for short), or, may be connected to an external computer (e.g., connected by an Internet service provider through the Internet).

The flowcharts and block diagrams in the drawings illustrate probably-implemented system architectures, functions and operations of the system, method and computer program product according to various embodiments of the present disclosure. In this regard, each block in the flowcharts or the block diagrams may represent a module, a program segment or part of codes, and the module, the program segment, or the part of codes includes one or more executable instructions used for achieving a specified logical function. It is also to be noted that, in some alternative implementations, the functions marked in the blocks may be implemented in an order different from those marked in the drawings. For example, two continuous blocks may actually be executed substantially concurrently, or may be executed in a reverse sequence sometimes, which is determined by the involved functions. It should also be noted that, each block in the block diagrams and/or the flowcharts and a combination of the blocks in the block diagrams and/or the flowcharts may be implemented by a dedicated hardware-based system used for executing a specified function or operation, or may be implemented by a combination of dedicated hardware and computer instructions.

The units involved in the embodiments of the present disclosure may be implemented by software or hardware. The names of these units do not form any limitation on the units in some cases. For example, the acquisition unit may also be described as "the unit that acquires the target audio."

The above-described functions herein may be at least partially executed by one or more hardware logic components. Exemplarily but unrestrictively, examples of the hardware logic component may include a Field-Programmable Gate Array (FPGA for short), an Application Specific Integrated Circuit (ASIC for short), an Application Specific Standard Product (ASSP for short), a System on Chip (SOC for short), a Complex Programmable Logic Device (CPLD for short), and so on.

In the context of the present disclosure, the machine-readable medium may be a physical medium, and may include or store a program used by or in combination with an instruction execution system, apparatus or device. The machine-readable medium may include, but is not limited to, an electronic, magnetic, optical, electromagnetic, infrared or semiconductor system, apparatus or device, or any proper combination thereof. More specific examples of the machine-readable storage medium may include an electrical connection based on one or more wires, a portable computer disk, a hard disk, a Random Access Memory (RAM), a Read-Only Memory (ROM), an Erasable Programmable ROM (EPROM) (or a flash memory), an optical fiber, a portable Compact Disc Read-Only Memory (CD-ROM), an optical storage device, a magnetic storage device, or any proper combination thereof.

In a first aspect, according to one or more embodiments of the present disclosure, a video generation method is provided, including: acquiring a target audio; generating an image sequence according to characteristic information of the target audio and an image generation model, wherein the image generation method is used for generating a corresponding image according to a randomly input vector; and combining the target audio and the image sequence to generate a target video corresponding to the target audio.

According to one or more embodiments of the present disclosure, wherein before the generating of the image sequence according to the characteristic information of the target audio and the image generation model, the method further includes: determining a target scene type to which the target audio belongs; and determining the image generation model corresponding to the target scene type, wherein the image generation model corresponding to the target scene type is used for generating an image corresponding to the target scene type according to the randomly input vector.

According to one or more embodiments of the present disclosure, the determining of the target scene type to which the target audio belongs includes: determining the target scene type as a scene type matching the identification information of the target audio from multiple scene types.

According to one or more embodiments of the present disclosure, the determining of the image generation model corresponding to the target scene type includes: determining the image generation model corresponding to the target scene type based on a correspondence relationship between the scene type and the image generation model.

According to one or more embodiments of the present disclosure, the generating of the image sequence according to the characteristic information of the target audio and the image generation model includes: randomly determining an initial input vector; and performing multiple times image generation through the image generation model according to the input vector and the characteristic information to obtain the image sequence, wherein in the multiple times image generation, the characteristic information of the target audio is used to update the input vector.

According to one or more embodiments of the present disclosure, update directions of the input vectors in the multiple times image generation are consistent, and the performing of multiple times image generation through the image generation model according to the input vector and the characteristic information to obtain the image sequence includes: determining a direction vector; and performing multiple times image generation through the image generation model according to the input vector, the characteristic information and the direction vector to obtain the image sequence, wherein the direction vector is related to the update direction of the input vector in each image generation.

According to one or more embodiments of the present disclosure, the characteristic information includes the frequencies of the target audio in multiple units of time, and an image generation process of the multiple times image generation includes: determining a frequency of the target audio in the target unit of time, wherein the target unit of time is a unit of time corresponding to the current times of image generation; updating the input vector according to the frequency of the target audio in the target unit of time and the direction vector; and inputting the updated vector into the image generation model to obtain a current frame image.

According to one or more embodiments of the present disclosure, the characteristic information further includes amplitudes of the target audio in multiple units of time, and after the updating of the input vector according to the frequency in the target unit of time of the target audio and the direction vector, the method further includes: in a case where an amplitude difference between an amplitude of the target audio in the target unit of time and an amplitude in the last unit of time is greater than a difference threshold, determining a disturbance amount, according to the amplitude difference and the direction vector; and updating the updated input vector again according to the disturbance amount.

According to one or more embodiments of the present disclosure, the image generation model is a generative adversarial model, and the generating of the image sequence according to the characteristic information of the target audio and the image generation model includes: generating the image sequence according to the characteristics of the target audio information and a generator in the image generation model.

In a second aspect, according to one or more embodiments of the present disclosure, a model determination method is provided, including: acquiring training data, which includes multiple images; and training an image generation model for multiple times based on the training data, wherein the image generation model is used for generating a corresponding image based on a randomly input vector. A training process of the image generation model includes: randomly determining an input vector, and randomly determining label data from the multiple images; inputting the input vector into the image generation model to obtain an output image; and adjusting the image generation model according a difference between the output image and the label data.

According to one or more embodiments of the present disclosure, the acquiring of training data includes: acquiring multiple scene images under multiple scene types; and determining, for each scene type, training data corresponding to the scene type, wherein the training data includes multiple scene images under the scene type.

According to one or more embodiments of the present disclosure, the training of the image generation model multiple times based on the training data includes: for each scene type, based on training data corresponding to the scene type, training an image generation model corresponding to the scene type.

According to one or more embodiments of the present disclosure, the determining of the input vector randomly and the determining of label data from the multiple images randomly includes: randomly determining an input vector based on a preset data distribution; and selecting label data from the multiple images by means of sampling without replacement.

According to one or more embodiments of the present disclosure, the image generation model is a generative adversarial network model.

In a third aspect, according to one or more embodiments of the present disclosure, a video generation device is provided, including: an acquisition unit for acquiring a target audio; an image generation unit for generating an image sequence according to characteristic information of the target audio and an image generation model, wherein the image generation model is used for generating a corresponding image according to a randomly input vector; a video generation unit for combining the target audio and the image sequence to generate a target video corresponding to the target audio.

According to one or more embodiments of the present disclosure, the video generation device further includes a determination unit, wherein the determination unit is used for: determining a target scene type to which the target audio belongs; determining an image generation model corresponding to the target scene type, wherein the image generation model corresponding to the target scene type is used for generating an image corresponding to the target scene type according to a randomly input vector.

According to one or more embodiments of the present disclosure, the determination unit is further used for: determining the target scene type as a scene type that matches identification information of the target audio from multiple scene types.

According to one or more embodiments of the present disclosure, the determination unit is further used for: determining an image generation model corresponding to the target scene type based on a correspondence relationship between the scene type and the image generation model.

According to one or more embodiments of the present disclosure, the image generation unit is further used for: randomly determining an initial input vector; performing multiple times image generation through the image generation model according to the input vector and the characteristic information to obtain the image sequence, wherein the characteristic information of the target audio is used for updating the input vector in the multiple times image generation.

According to one or more embodiments of the present disclosure, update directions of the input vectors in the multiple times image generation are consistent, and the image generation unit is further used for: determining a direction vector; and performing multiple times image generation through the image generation model according to the input vector, the characteristic information and the direction vector to obtain the image sequence, wherein the direction vector is related to the update direction of the input vector in each image generation.

According to one or more embodiments of the present disclosure, the characteristic information includes the frequencies of the target audio in multiple units of time, and the image generation unit in an image generation process of the multiple times image generation is used for: determining frequencies of the target audio in the target unit of time, wherein the target unit of time is a unit of time corresponding to the current times of image generation; updating the input vector according to the frequency in the target unit of time of the target audio and the direction vector; and inputting the updated input vector into the image generation model to obtain a current frame image.

According to one or more embodiments of the present disclosure, the characteristic information further includes the amplitudes of the target audio in multiple units of time, and the image generation unit is further used for: in a case where an amplitude difference between an amplitude of the target audio in the target unit of time and an amplitude of the target audio of the last unit of time is greater than a difference threshold, determining a disturbance amount according to the amplitude difference and the direction vector; and updating the updated input vector again according to the disturbance amount.

According to one or more embodiments of the present disclosure, the image generation model is a generative adversarial model, and the image generation unit is further used for: generating the image sequence according to the characteristic information of the target audio and a generator in the image generation model.

In a fourth aspect, according to one or more embodiments of the present disclosure, a model determination device is provided, including: an acquisition unit for acquiring training data, which includes multiple images; and a training unit for training the image generation model for multiple times based on the training data, wherein the image generation model is used for generating a corresponding image according to a randomly input vector. In a training process of the image generation model, the training unit is further used for: randomly determining an input vector and randomly determining label data from the multiple images; inputting the input vector into the image generation model to obtain an output image; and adjusting the image generation model according to a difference between the output image and the label data.

According to one or more embodiments of the present disclosure, the acquisition unit is further used for: acquiring multiple scene images under multiple scene types; and determining, for each scene type, training data corresponding to the scene type, wherein the training data includes multiple scene images under the scene type.

According to one or more embodiments of the present disclosure, the training unit is further used for: training an image generation model corresponding to the scene type for each scene type, based on training data corresponding to the scene type.

According to one or more embodiments of the present disclosure, the training unit is also used for: randomly determining an input vector based on a preset data distribution; and selecting the label data from the multiple images by means of sampling without replacement.

According to one or more embodiments of the present disclosure, the image generation model is a generative adversarial network model.

In a fifth aspect, according to one or more embodiments of the present disclosure, an electronic device is provided, including: at least one processor and a memory; wherein the memory stores computer execution instructions; the at least one processor executes the computer execution instructions stored in the memory, causing the at least one processor to perform the video generation method as described in the above first aspect or various possible designs of the first aspect, or causing the at least one processor to perform the model determination method as described in the second aspect or various possible designs of the second aspect.

In a sixth aspect, according to one or more embodiments of the present disclosure, a computer-readable storage medium is provided, having computer-executable instructions stored thereon that, when executed by a processor, implement the video generation method as described in the above first aspect or various possible designs of the first aspect, or implement the model determination method as described in the above second aspect or various possible designs of the second aspect.

In a seventh aspect, according to one or more embodiments of the present disclosure, a computer program product is provided, containing computer-executable instructions that, when executed by the processor, implement the video generation method as described in the first aspect or various possible designs of the first aspect, or implement the model determination method as described in the second aspect or various possible designs of the second aspect.

In an eighth aspect, according to one or more embodiments of the present disclosure, a computer program is provided, containing computer-executable instructions that, when executed by a processor, implement the video generation method as described in the first aspect or various possible designs of the first aspect, or implement the model determination method as described in the second aspect or various possible designs of the second aspect.

According to the video generation method, model determination method, device, storage medium, computer program product and computer program provided in the present embodiment, the image sequence is generated based on the characteristic information of the target audio and the image generation model, and the target audio and the image sequence are combined to generate the target video corresponding to the audio, wherein the image generation model is used for generating the corresponding image according to the randomly input vector. Thereby, through combining the characteristic information of the audio and the image generation model for generating the corresponding image according to the randomly input vector, a video that is suitable for the audio, personalized and without copyright risk is generated for the audio, and the efficiency of converting the audio to the video is improved. Thus, the audio may be converted into a video with richer content.

The messages interacted between multiple apparatus or the names of the information in the embodiments of the present disclosure are for illustrative purposes only and are not used to limit the scope of these messages or information.

It can be understood that before using the technical solutions disclosed in the embodiments of this disclosure, users should be informed of the type, scope of use, usage scenarios, etc. of the personal information involved in this disclosure in an appropriate manner in accordance with relevant laws and regulations and the user's authorization should be obtained.

For example, in response to receiving an active request from a user, prompt information is sent to the user to clearly remind the user that the operation requested will require the acquisition and use of the user's personal information. Therefore, users may autonomously choose whether to provide personal information to software or hardware such as electronic devices, applications, servers or storage media that perform the operations of the technical solution of the present disclosure according to the prompt information.

As an optional but non-limiting implementation method, in response to receiving the user's active request, the method of sending prompt information to the user may be, for example, a pop-up window, and the prompt information may be presented in the form of text in the pop-up window. In addition, the pop-up window may also carry a selection control for the user to choose "agree" or "disagree" to provide personal information to the electronic device.

It may be understood that the above process of notifying and obtaining user authorization is only illustrative and does not limit the implementation of the present disclosure. Other methods that satisfy relevant laws and regulations may also be applied to the implementation of the present disclosure.

It can be understood that the data involved in the present technical solution (including but not limited to the data itself, the acquisition or use of the data) should comply with the requirements of corresponding laws, regulations and related regulations.

The above description is only a description of the preferred embodiments of the present disclosure and the technical principles applied. Those skilled in the art should know that the scope of disclosure involved in the present disclosure is not limited to the technical solutions formed by specifically combining the above-mentioned technical features and shall cover other technical solutions formed by freely combining the above-mentioned technical features or equivalent features thereof without departing from the concept of the present disclosure, for example, technical solutions formed by interchanging the above-mentioned features and (but not limited to) the technical features with similar functions disclosed in the present disclosure.

Although each operation is described in a specific order, it should not be explained that these operations are required to be executed in the shown specific order or in sequence. In a certain environment, multi-task and concurrent-processing may be favorable. Likewise, a plurality of specific implementation details are included in the above discussion, but they should not be explained as limits to the scope of the present disclosure. Some features described in the context of an independent embodiment may be combined for implementation in a single embodiment. On the contrary, various described in the context of a single embodiment may be implemented in a plurality of embodiments independently or in form of any proper sub-combination.

Although the subject matter has been described with a language specific to the structural features and/or logic operations in the method, it should be understood that the subject matter defined in the appended claims is not limited to the above-described specific features or operations.

We claim:

1. A video generation method, including:

acquiring a target audio;

generating an image sequence according to characteristic information of the target audio and an image generation model, wherein the image generation model is used for generating a corresponding image based on a randomly input vector, wherein generating the image sequence according to the characteristic information of the target audio and the image generation model comprises:

randomly determining an initial input vector, and performing multiple times image generation through the image generation model according to the input vector and the characteristic information to obtain the image sequence, wherein in the multiple times image generation, the characteristic information of the target audio is used for updating the input vector; and combining the target audio and the image sequence to generate a target video corresponding to the target audio.

2. The video generation method according to claim 1, wherein before the generating of an image sequence according to characteristic information of the target audio and an image generation model, the method further includes:

determining a target scene type to which the target audio belongs; and determining an image generation model corresponding to the target scene type, wherein the image generation model corresponding to the target scene type is used for generating an image corresponding to the target scene type according to a randomly input vector.

3. The video generation method according to claim 2, wherein the determining of a target scene type to which the target audio belongs includes:

determining the target scene type as a scene type that matches identification information of the target audio from multiple scene types.

4. The video generation method according to claim 2, wherein the determining the image generation model corresponding to the target scene type includes:

determining, based on a correspondence relationship between at least one scene type and at least one image generation models, the image generation model corresponding to the target scene type.

5. The video generation method according to claim 1, wherein update directions of the input vector in the multiple times image generation are consistent, and the performing of multiple times image generation through the image generation model according to the input vector and the characteristic information to obtain the image sequence includes:

determining a direction vector;

performing the multiple times image generation through the image generation model according to the input vector, the characteristic information, and the direction vector to obtain the image sequence, wherein the direction vector is related to the update direction of the input vector in each image generation.

6. The video generation method according to claim 1, wherein the characteristic information includes frequencies of the target audio in multiple units of time, and an image generation process in the multiple times image generation includes:

determining a frequency of the target audio in a target unit of time, wherein the target unit of time is a unit of time corresponding to the current times of image generation;

updating the input vector according to the frequency in the target unit of time of the target audio and the direction vector; and inputting the updated input vector into the image generation model to obtain a current frame image.

7. The video generation method according to claim 6, wherein the characteristic information further includes amplitudes of the target audio in multiple units of time, and after updating the input vector according to the frequency in the target unit of time of the target audio and the direction vector, the method further includes:

in a case where an amplitude difference between an amplitude in the target unit of time and an amplitude in the last unit of time of the target audio is greater than a difference threshold, determining a disturbance amount according to the amplitude difference and the direction vector; and updating the updated input vector again according to the disturbance amount.

8. The video generation method according to claim 1, wherein the image generation model is a generative adversarial model, and the generating of an image sequence according to characteristic information of the target audio and an image generation model includes:

generating the image sequence according to the characteristic information of the target audio and a generator in the image generation model.

9. A method for training the image generation model of claim 1, including:

acquiring training data including multiple images; and training the image generation model for multiple times based on the training data by a training process, wherein the training process comprises:

randomly determining an input vector, and randomly determining label data from the multiple images;

inputting the input vector into the image generation model to obtain an output image; and adjusting the image generation model according to a difference between the output image and the label data.

10. The method according to claim 9, wherein the acquiring of training data includes:

acquiring multiple scene images under multiple scene types; and determining, for each scene type, the training data corresponding to the scene type, wherein the training data includes multiple scene images under the scene type.

11. The method according to claim 10, wherein the training of an image generation for model multiple times based on the training data includes:

training, for each scene type, the image generation model corresponding to the scene type based on the training data corresponding to the scene type.

12. The method according to claim 9, wherein the randomly determining of an input vector, and the randomly determining of label data from the multiple images includes:

randomly determining the input vector based on a preset data distribution; and selecting the label data from the multiple images by means of sampling without replacement.

13. The method according to claim 9, wherein the image generation model is a generative adversarial network model.

14. A video generation device, including:

at least one processor and a memory, the memory storing computer-executable instructions, wherein the computer-executable instructions upon execution by the at least one processor cause the at least one processor to implement operations, the operations including:

acquiring a target audio;

generating an image sequence according to characteristic information of the target audio and an image generation model, wherein the image generation model is used for generating a corresponding image according to a randomly input vector, wherein generating the image sequence according to the characteristic information of the target audio and the image generation model comprises:

randomly determining an initial input vector, and performing multiple times image generation through the image generation model according to the input vector and the characteristic information to obtain the image sequence, wherein in the multiple times image generation, the characteristic information of the target audio is used for updating the input vector; and combining the target audio and the image sequence to generate a target video corresponding to the target audio.

15. The video generation device according to claim 14, wherein before the generating of an image sequence according to characteristic information of the target audio and an image generation model, the operations further include:

determining a target scene type to which the target audio belongs; and determining an image generation model corresponding to the target scene type, wherein the image generation model corresponding to the target scene type is used for generating an image corresponding to the target scene type according to a randomly input vector.

16. The video generation device according to claim 15, wherein the determining of a target scene type to which the target audio belongs includes:

determining the target scene type as a scene type that matches identification information of the target audio from multiple scene types.

17. The video generation device according to claim 15, wherein the determining the image generation model corresponding to the target scene type includes:

determining, based on a correspondence relationship between at least one scene type and at least one image generation model, the image generation model corresponding to the target scene type.

18. The video generation device according to claim 14, wherein update directions of the input vector in the multiple times image generation are consistent, and the performing of multiple times image generation through the image generation model according to the input vector and the characteristic information to obtain the image sequence includes:

determining a direction vector;

performing the multiple times image generation through the image generation model according to the input vector, the characteristic information, and the direction vector to obtain the image sequence, wherein the direction vector is related to the update direction of the input vector in each image generation.

19. The video generation device according to claim 14, wherein the characteristic information includes frequencies of the target audio in multiple units of time, and an image generation process in the multiple times image generation includes:

determining a frequency of the target audio in a target unit of time, wherein the target unit of time is a unit of time corresponding to the current times of image generation;

updating the input vector according to the frequency in the target unit of time of the target audio and the direction vector; and inputting the updated input vector into the image generation model to obtain a current frame image.

20. The video generation device according to claim 14, wherein the image generation model is a generative adversarial model, and wherein the generating the image sequence according to characteristic information of the target audio and an image generation model comprises generating the image sequence according to the characteristic information of the target audio and a generator in the image generation model.

* * * * *